Patented Oct. 19, 1937

2,096,533

UNITED STATES PATENT OFFICE 2,096,533

BASIC NITROGENOUS CONDENSATION PRODUCTS AND PROCESS OF MAKING SAME

Otto Bayer, Leverkusen-on-the-Rhine, Ferdinand Muenz, Frankfort-on-the-Main, and Karl Keller, Frankfort-on-the-Main-Fechenheim, Germany, assignors to General Aniline Works, Inc., New York, N. Y., a corporation of Delaware No Drawing. Application March 16, 1934, Serial No. 715,992. In Germany March 18, 1933

1 Claim. (Cl. 260—27)

Our invention relates to valuable new nitrogenous condensation products which are characterized by the fact that they contain in the molecule the radicle of at least one aliphatic polyamine, which is substituted at nitrogen atoms by at least two radicles of an acid or one radicle of an acid and one alkyl group.

The new products are obtained by reacting with at least one molecular proportion of an aliphatic polyamine on compounds capable of introducing into the polyamine molecule at least two acid radicles, particularly a cyanuric halide, or compounds capable of introducing into the polyamine molecule at least one acid radicle and one alkyl group.

As suitable aliphatic polyamines higher polymeric alkylene diamine mixtures may be mentioned, which are obtainable by heating ethylene chloride or likewise other alkylenehalides with ammonia (see Berichte, vol. 23, page 3711) or amines, or the products obtained by treating halogenated paraffins with ammonia or corresponding products obtained by the interaction of halogenated paraffins with organic ammonia derivatives.

As reaction components capable of introducing into the polyamine molecule at least two acid radicles particularly cyanuric halides or partly substituted derivatives thereof such as cyanuric chloride, cyanuric acid dichloride, 1-methylamino-3.5-dichloro-triazine, cyanuric acid, oxalic acid, oxalyl chloride, terephthaloyl chloride, benzene or naphthalene disulfochlorides may be mentioned.

Since only such final products are valuable which still contain basic groups, for the present condensation reaction care is to be taken that only such quantities of the said acidifying compounds are used as are insufficient for complete reaction of the aliphatic polyamine used as the other reaction component. As second reaction components which, in the reaction with the polyamine, act as agents with the introduction of one or more acid radicles and also as alkylating agents such compounds are suitable as contain on the one hand alkylating groups such as the groups R—halogen, R—OSO₃H, R—OSO₂—aryl (R=alkyl) and alkylene and on the other hand acylating groups such as —COOH, —COOR, —CO—halogen and —SO₂—halogen.

Compounds of this type are for example chloracetylchloride, monochloracetic ester, chlorethane sulfochloride, chlormethyl-benzene sulfochloride, acrylic acid and its derivatives, maleic acid anhydride or fumaric acid esters, dihalogen-adiphic acid and the corresponding derivatives of homologous acids.

As reaction components furthermore such products come into consideration as already contain one or more organic acid amide groups, such as

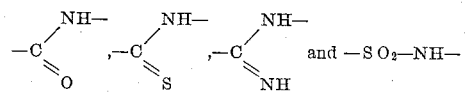

In this case the polyamine reacts with such groups with splitting off of ammonia. In such reactions care must likewise be taken that the final products still retain basic character. The number of compounds of this type is very large. The following instances may be mentioned without any claim to completeness: oxamide, nitrogenous derivatives of carbonic and thiocarbonic acids such as urea and thourea and their alkyl and aryl derivatives, biuret, carbazide, semicarbazide, guanidine, guanyl-urea and biguanide, allantoin or pyruvil, the various uric acids and ureides, furthermore: urethanes, uric acid esters, guanido-carbonic acid esters, allophanic acid chloride, biuret-carbonic acid chloride, chloracetylamides and the like.

By acting with carbon disulfide on polyamines with a subsequent heating, compounds of a similar effect are formed with splitting off of hydrogen sulfide it being uncertain whether the thiourea derivatives of the polyamines probably formed are themselves the reaction products or whether they react with a further polyamine molecule.

The reaction products formed are for the most part viscous oils or colorless powders. In most cases they are water soluble as such and also in the form of their mineral acid salts. In some cases when water insoluble products are formed it may be advisable to convert them into water-soluble compounds by aftertreating them with alkylene oxides.

The new products are capable of varied application for example for the production of water insoluble color lakes, since the majority of the present products form insoluble lakes when combined with soluble dyestuffs containing acid groups or for the aftertreatment of dyeings, particularly when obtained on cellulosic materials by means of substantive dyestuffs in order to improve their fastness. The present products are important intermediates for the production of further valuable conversion products.

In order to further illustrate our invention the following examples are given; but we wish it however, to be understood that our invention is not limited to the particular products or reacting conditions stated therein.

*Example 1*

To a mixture of 150 parts of trichlorethylene with 75 parts of a polyethylene polyamine mixture, which is obtained by acting with ammonia on ethylene chloride (see Berichte, Vol. 23, page 3711) and boils under a pressure of 15 mm. between 90° C. and above 350° C., at about 60° C. to 65° C. while stirring a solution of 55.5 parts of cyanuric chloride in about 450 parts of trichlorethylene is added. Then the mass is held at this temperature for about two further hours, the solvent is distilled off with steam and the precipitated condensation product is filtered off and dried. An excess of polyethylene polyamine can be isolated from the aqueous filtrate by adding a concentrated caustic soda solution thereto. The new condensation product represents a white powder insoluble in the usual solvents. It contains about 13% of chlorine and 36% of nitrogen.

When boiling it with dilute caustic alkali solutions a similar compound is obtained in which probably the residual chlorine is replaced by hydroxy groups.

A product which is practically free from chlorine is obtained when carrying out the condensation of cyanuric chloride with polyethylenediamine with the addition of a sodium carbonate solution.

When using instead of cyanuric trichloride for instance cyanuric acid dichloride or cyanuric acid amide dichloride analogous products are obtained.

Instead of this solution of cyanuric chloride in organic solvents likewise there may be used an aqueous suspension of cyanuric chloride obtainable for instance by pouring a concentrated solution thereof in acetone into water. In this case the condensation may be carried out advantageously at somewhat lower temperatures.

30 parts of the condensation product obtained according to the first paragraph of this example are gradually mixed with 30 parts of ethyleneoxide and the mixture is heated while stirring in an autoclave for 5 to 6 hours at 100° C. to 140° C.

In this manner a yellowish clear sirupy substance is obtained which is entirely soluble in water. Instead of ethyleneoxide other alkyleneoxides such as propyleneoxide, butyleneoxide, glycide and the like are useful.

The products thus obtained show the above cited properties, particularly they increase when after treated therewith the fastness to water of dyeings, prepared on cellulosic materials with substantive dyestuffs.

*Example 2*

40.5 parts of polyethylenepolyamine mixture, which boils under 6 mm. pressure from 90° C. to above 250° C., are dissolved in about 100 parts of trichloroethylene or chloroform, then while stirring at about 20° C. to 25° C. 80 parts of hydrochloric acid of 30% strength and subsequently at about 15° C. to 20° C. during about 2 to 3 hours a solution of 18.5 parts of cyanuric chloride in about 200 parts of trichloroethylene or chloroform is added. Then slowly a concentrated solution of 160 parts of crystallized sodium acetate is added and the mass is finally neutralized with an aqueous solution of 58 parts of sodium carbonate during about 3 hours. The solvent is removed by distillation with steam, the remaining solution is evaporated partly and when cool the crystallizing inorganic salts are removed by filtration. The isolated free base represents a brownish viscous oil.

A product of similar valuable properties is obtained when preparing by the interaction of corresponding quantities of cyanuric chloride and monoethanol amine and condensing the cyanuric-dimonoethanolamine-monochloride thus formed with one molecular proportion of polyethylenepolyamine.

*Example 3*

To a solution of 99.2 parts of a polyethylene mixture in about 125 parts of trichloroethylene a solution of 19 parts of oxalylchloride in about 120 parts of trichloroethylene is slowly added while stirring at 20° C. to 30° C. and the temperature of the mixture is increased to 60° C. to 70° C. After having distilled off the trichloroethylene the new condensation product is obtained as hydrochloride as a yellowish sirupy substance which may be converted into the free base by adding a sodium carbonate solution. The salt as well as the free base are easily soluble in water.

*Example 4*

146 parts of polyethylenepolyamine are mixed with 35 parts of biuret or the double quantity of crude biuret, obtained by introducing chlorine into molten urea at 130° C. to 120° C., and the mixture is heated for some hours at 135° C. to 140° C. While splitting off ammonia condensation takes place. When cool the condensation product is obtained as a light brown sirup like substance.

The condensation products obtained by acting on aliphatic polyamines with polyvalent aliphatic compounds such as cyanuric acid chloride or oxalyl chloride or biuret, are most valuable.

We claim:

A basic nitrogenous condensation product, being as free base a brownish viscous oil, capable of forming water-insoluble color lakes with dyestuffs containing acid groups, which product is obtained by interacting with a polyethylene-polyamine mixture, which boils under 6 mm. pressure from 90° C. to over 250° C., with cyanuric chloride in an acid medium.

OTTO BAYER.
FERDINAND MUENZ.
KARL KELLER.